United States Patent Office 2,744,884
Patented May 8, 1956

2,744,884

N-TERT-ALKYLAMINOALKYL ESTERS

Peter L. de Benneville, Philadelphia, Pa., assignor to Rohm & Haas Company, Philadelphia, Pa., a corporation of Delaware No Drawing. Application July 20, 1954,
Serial No. 444,645

16 Claims. (Cl. 260—78.5)

This invention relates to N-tert-alkylaminoalkyl esters of acrylic and methacrylic acid and to a method for the preparation of these esters. It also deals with polymers and copolymers from these esters.

The most convenient method for preparing esters of this invention comprises reacting a tert-alkylaminoalkanol, $RNHC_nH_{2n}OH$, where R is a tertiary alkyl group or a trialkylcarbinyl group and n is an integer from two to three with a lower alkyl ester of acrylic or methacrylic acid, $R°OOCC(R^x)=CH_2$, where $R°$ is an alkyl group, preferably of not over four carbon atoms, and $R^x$ is hydrogen or the methyl group. Under the influence of a transesterification catalyst a lower alkanol is split out and an amino-ester is formed.

Ordinarily, when a secondary amine is reacted with an ester, an amide is formed. For example, when N-ethyl-N-hydroxy-ethylamine is mixed with ethyl acrylate together with or without an alkaline catalyst such as sodium methoxide, no amino ester can be separated. In the absence of a polymerization inhibitor insoluble polymeric products are formed. With an inhibitor present, the products remain monomeric but are essentially free of amino nitrogen. This is the course of reaction for acrylic or methacrylic esters when reacted with N-methyl-N-hydroxyethylamine, N-ethyl-N-hydroxyethylamine, N-isopropyl-N-hydroxyethylamine, N-n-butyl-N-hydroxyethylamine, or other similar secondary amines where the alkyl group is primary or secondary.

With these established facts in mind it is surprising to find that there are secondary amines having a hydroxyalkyl group which yield not amides but amino esters which still possess a reactive hydrogen on the amine nitrogen thereof.

The reaction appears to require such a catalyst as an alkali metal, an alkali metal alkoxide, an aluminum alkoxide, or a tetraalkyl titanate. The amount of catalyst used is generally between 0.1% and 3% of the weight of the reactants. Typical catalysts are sodium or potassium metal, sodium methoxide, potassium butoxide, aluminum isopropoxide, and tetraisopropyl titanate. Alkoxides up to four carbon atoms are preferred. Also, the preferred titanates contain alkyl groups of not over four carbon atoms.

As N-hydroxyalkyl secondary amines there may be used any N-tert-alkyl-N-hydroxyethylamine or N-tert-alkyl-N-hydroxypropylamine. These amines may be represented by the formula $RHNCH_nH_{2n}OH$ where $C_nH_{2n}$ is an alkylene group having two carbon atoms between oxygen and nitrogen and containing not over three carbon atoms and R is a tertiary alkyl group of four to twenty-four carbon atoms. These amines may also be represented by the structure

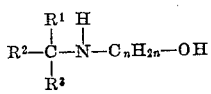

where $R^1$, $R^2$, and $R^3$ are alkyl groups containing a total of three to twenty-three carbon atoms.

The amines of the above structure are obtainable from tert-alkylamines which are now commercially available. These have the structure

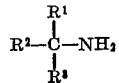

They can be reacted with one mole of ethylene or propylene oxide per mole of amine. While with the smaller tert-alkylamines there is some tendency for the second hydrogen to react also, the amount of dihydroxyalkyl product formed is not large and the desired N-tert-alkyl-N-hydroxyalkylamine can be cleanly separated therefrom. With tert-alklamines of about 12 carbon atoms and upward the reaction with ethylene oxide or propylene oxide tends to cease with the formation of a single N-hydroxyalkyl group. The introduction of one mole of alkylene oxide is best accomplished in the presence of a little water or with the aid of an aqueous acid catalyst. For this purpose there may be used 10 to 30 mole per cent of a strong inorganic acid, such as sulfuric or hydrochloric. When one hydroxyalkyl group has been introduced, the catalyst is destroyed.

The preparation of some typical N-tert-alkyl-N-hydroxy-ethylamines will now be described. Parts shown are by weight.

PREPARATION A

There were mixed in a reaction vessel equipped with stirrer, thermometer, and inlet tube 286 parts of a technical tert-octadecylamine, which comprised chiefly $C_{18}$ amines with some higher tert-alkyl primary amines, and 28.6 parts of aqueous 35% hydrochloric acid. The mixture was stirred and heated to about 90° C., whereupon ethylene oxide was introduced through the inlet tube. The temperature was held at 90°–94° C. and the pressure at one to five pounds gauge until 44 parts of ethylene oxide had been added. The water was then taken off under reduced pressure and about 200 parts of aqueous 5% sodium hydroxide solution added. The water layer was taken off and a second 200 part portion of 5% sodium hydroxide added and then separated. The washed oil was stripped under low pressure and filtered to give 330 parts of a clear red oil. This had a neutral equivalent of 326, thus corresponding essentially to N-hydroxyethyl-tert-octadecylamine, the theoretical neutral equivalent being 330.

PREPARATION B

A technical mixture of trialkylcarbinylamines from $C_{18}$ to $C_{24}$ having a neutral equivalent of 360 was reacted as in Preparation A with a molar proportion of ethylene oxide. There was thereby formed an N-hydroxyethyl-tert-carbinylamine having a neutral equivalent of 405, a density at 50° C. of 0.865, and a congealing temperature of −15° C.

PREPARATION C

Ethylene oxide was passed at 80° C. into a mixture of 200 parts of a trialkylcarbinylamine containing chiefly a tert-dodecyl group together with some higher alkyl groups up to tert-pentadecyl, 20 parts of aqueous 35% hydrochloric acid, and 15 parts of water. After three hours 32 parts of ethylene oxide had been reacted. The reaction mixture was washed with aqueous 15% sodium hydroxide solution and with 250 parts of water. The reaction mixture was then distilled. After unreacted amines had been taken off, a main fraction of 139 parts of N-hydroxyethyl-trialkylcarbinylamine was obtained at 157°–169° C./.15 mm. The residue amounted to 14 parts.

PREPARATION D

In the same way tert-nonylamine (derived from propylenetrimer) was treated with 0.1 mole per cent of aqueous 20% sulfuric acid solution and then with propylene oxide at 90°–100° C. One mole of this oxide was taken up per mole of amine. The reaction product was treated with a little 50% caustic solution, separated, and stripped free of water to give a product corresponding in composition to tert-$C_9H_{19}NHC_3H_6OH$.

PREPARATION E

A mixture is made of 25 parts of water and 256 parts of tert-octylamine. Thereto is added propylene oxide in an amount of 120 parts. The mixture is heated under reflux for three hours and left standing for 16 hours. The reaction mixture is distilled. After a small fore-run there is obtained a fraction of 273 parts, distilling at 100°–110° C./8 mm. It corresponds in composition to 1-tert-octylamino-2-propanol. The neutralization equivalent found is 194 (theory 187).

Other tert-alkylamines can be reacted in the same way to give N-tert-alkyl-N-hydroxyalkylamines. These may be entities or mixtures.

The reaction of N-tert-alkylamines and ethylene oxide or propylene oxide to give the monohydroxyalkyl compounds is carried out between 0° and 180° C., preferably between 60° and 95° C. Usually pressure is not necessary, but may be used if so desired. When the reaction has been carried to the stage where about one mole of ethylene or propylene oxide has been taken up per mole of amine, the reaction is stopped and, if an acid catalyst has been used, the acid catalyst is destroyed, as by adding alkali and washing the product. The smaller molecular sized products may be distilled.

The acrylic esters with which the N-tert-alkyl-N-hydroxyalkylamines are reacted are the methyl, ethyl, propyl, and butyl esters of acrylic and methacrylic acid. Usually it is definitely desirable to use esters containing a polymerization inhibitor or to add such inhibitor. Typical useful inhibitors are di-β-naphthol, hydroquinone, and p-hydroxydiphenylamine. Since these and many other polymerization inhibitors for use in acrylic esters are well known, the possible inhibitors need not be elaborated here.

Amine and ester, best in excess, are mixed, a transesterification catalyst is added, and the mixture is heated with removal of an alcohol. This reaction may be accomplished under normal, increased, or reduced pressure. Usually the reaction is run at the temperatures at which an alcohol is distilled from the reaction mixture. Pot temperatures from about 80° to about 160° C. have been observed, while overhead temperatures between 60° and 135° C. have been noted. The product is first obtained as a residue, which may be purified by such conventional methods as charcoaling, extracting, or distilling.

Additional details are given in the following illustrative examples. Parts are again by weight.

Example 1

(a) A reaction vessel arranged to operate under positive pressures is charged with 258 parts of 2-amino-2,4,4-trimethylpentane and 30 parts of water. The charge is heated to about 75° C. Ethylene oxide is passed in over a 2.5 hour period in an amount of 88 parts. The mixture is stirred for an hour and then distilled. Unreacted amine is taken off. At 110° C./10 mm. a fraction of 160 parts is obtained. It is identified as N-tert-octylaminoethanol, $C_8H_{17}NHCH_2CH_2OH$. The residue is chiefly octyldiethanolamine.

(b) There are mixed 150 parts of the above N-tert-octylaminoethanol, 150 parts of commercial methyl acrylate containing a polymerization inhibitor, five parts of di-β-naphthol, and five parts of sodium methoxide. The mixture is heated to maintain a gentle flow of vapor through a small distilling head with partial reflux. A methyl acrylate-methanol azeotrope is taken off at 66° to 78° C. A fraction of methyl acrylate is distilled followed by an intermediate fraction and finally tert-octylaminoethyl acrylate at 130°–137° C./15 mm. This product contains by analysis 6.2% of nitrogen (theory 6.2%).

Example 2

There are charged to a reaction vessel 173 parts of β-(2,4,4-trimethyl-2-pentylamino)ethanol, 172 parts of redistilled methyl acrylate, 14.4 parts of di-β-naphthol, and 2 parts of aluminum isopropoxide. The mixture is heated to refluxing conditions and the vapors then passed through a short distilling column to yield over 12 hours 95 parts of methanol-methyl acrylate azeotrope. The reaction mixture is then subjected to fractional distillation. After removal of excess methyl acrylate, a fraction is taken at 125°–135° C./15 mm. which is impure tert-octylaminoethyl acrylate. A fraction taken at 135°–140° C./16 mm. amounting to 98 parts is quite pure tert-octylaminoethyl acrylate. By analysis this fraction contains 6.1% of nitrogen and has a neutral equivalent of 229 (theory 227). Hydrogenation to indicate unsaturation shows a purity of 96%.

The above procedure is repeated with ethyl acrylate in place of the above methyl acrylate. Ethyl alcohol is taken off along with ethyl acrylate. The product obtained is not quite so pure as that obtained above, but it is entirely satisfactory for use as a comonomer or as a chemical intermediate.

The procedure is also applied to N-tert-nonylaminoethanol and methyl acrylate. The end product is N-tert-nonylaminoethyl acrylate.

Example 3

A commercial tertiary alkylamine having alkyl groups of 12 to 15 carbon atoms is reacted with ethylene oxide as in Preparation C and the resulting N-alkyl-N-hydroxyethylamine isolated.

A mixture of 122 parts of this amine, 128 parts of n-butyl acrylate, 7.2 parts of di-β-naphthol, and one part of aluminum isopropoxide is heated and a distillate is taken off over an 11 hour period. The reaction mixture is then fractionally distilled. At 110°–170° C./0.8 mm. a fraction of 106 parts of yellow oil is obtained. It contains by analysis 4.4% of nitrogen. Theory for the tert-alkylaminoethyl acrylate would be 4.7% of nitrogen. This product behaves normally in polymerization and copolymerization reactions. It is about 92% pure alkylaminoethyl acrylate.

Example 4

There are mixed 58.5 parts of tert-butylaminoethyl alcohol, 86 parts of methyl acrylate, 7.2 parts of di-β-naphthol, and one part of aluminum isopropoxide. The mixture is heated with passage of vapors through a short column into a distilling head for partial take-off. Over a 10 hours period there are taken off 29 parts of methanol-methyl acrylate azeotrope at 65°–78° C. Methyl acrylate is then distilled off, followed by a small intermediate fraction at 85°–90° C./13 mm. Practically pure tert-butylaminoethyl acrylate is taken off at 90°–100° C./13 mm. This fraction has by analysis a neutral equivalent of 168 (theory 171) and a nitrogen content of 8.3% (theory 8.2%).

Repetition of this procedure with ethyl acrylate leads to a very similar product.

Example 5

To 163 parts of tert-butylaminoethanol is added one part of metallic sodium. Thereto is then added 327 parts of methyl methacrylate and five parts of di-β-naphthol. The reaction mixture is heated at first under complete reflux and then with partial take-off. In two hours there are taken off 87 parts of methanol and methyl methacrylate with the temperature rising from 64° to 97° C. The product is poured onto crushed ice, washed with water, and distilled. After a fraction of methyl methacrylate has been removed a fraction of 104 parts of a water-clear liquid distilled at 104°–109° C./15 mm. Analyses provide the following data: nitrogen 7.5%, bromine number 85, neutral equivalent 185. Corresponding theoretical values for N-tert-butylaminoethyl methacrylate are 7.56%, 86, and 185, respectively.

Repetition of the above procedure with use of sodium methoxide in place of sodium metal gives an equally good yield of pure tert-butylaminoethyl methacrylate.

*Example 6*

In a similar way 86.5 parts of β-(2,4,4-trimethyl-2-pentylamino)ethanol, 150 parts of methyl methacrylate, 7.2 parts or di-β-naphthol, and one part of aluminum isopropoxide are mixed and heated. Vapors are taken off through a short column. Over a 10 hour period methanol and methyl methacrylate are taken off. Distillation is continued under reduced pressure. After an impure fraction has been taken off, the bulk of the material is distilled at 125°–132° C./9 mm. This fraction, amounting to 76 parts, contains by analysis 5.7% of nitrogen and has a neutral equivalent of 242. For tert-octylaminoethyl methacrylate the theoretical nitrogen content is 5.8% and the neutral equivalent is 241.

*Example 7*

The procedure above is repeated with 117 parts (0.5 mole) of tert-alkylaminoethanol where the alkyl group is chiefly $C_{12}$, 140 parts of butyl methacrylate, four parts of potassium butoxide and polymerization inhibitor. Removal of butanol and excess butyl methacrylate is followed by fractionation under reduced pressure. The fraction taken at 140°–210° C./15 mm. consists principally of tert-dodecylaminoethyl methacrylate of fair purity.

*Example 8*

A tert-alkylaminoethanol is prepared from a cut of tert-alkylamines having a neutral equivalent of 280. The alkyl groups in this material range from $C_{18}$ to $C_{24}$. The method of Preparation B is followed, 213 parts of the amine cut and 20 parts of hydrochloric acid being mixed and reacted with 33 parts of ethylene oxide at 90°–95° C. during three hours. This reaction mixture is stirred for another hour cooled, washed with 80 parts of aqueous 10% sodium hydroxide solution and with water, and distilled. A main fraction of 181 parts is taken at 85°–175° C./1.5 mm., having a neutral equivalent of 325. This is tert-alkylaminoethanol.

There are mixed 83.5 parts of this product, 106 parts of n-btuyl methacrylate, 3.5 parts of hydroquinone, and one part of aluminum isopropoxide. This mixture is heated with slow distillation through a short column with partial take-off. Butyl alcohol is obtained up to 120° C., 16 parts being collected in eight hours. During the next four hours distillation is continued with the temperature being carried to 160° C. The pressure is reduced and butyl methacrylate removed to give a residue. This is taken up in benzene. The benzene solution is washed with a 2% solution of hydrochloric acid (to remove the aluminum compound), twice with two normal sodium hydroxide solution, and with water. The washed material is heated under low pressure to remove water and other volatile materials. There is obtained 90 parts of product which is chiefly tert-alkylaminoethyl methacrylate.

A portion of 25 parts of this product is treated with one half part of dimethyl azodiisobutyrate at 70° C. for 48 hours to give a polymer, which is a viscous material soluble in lubricating oils and which is useful as an additive therein, acting as a viscosity-index agent and anticorrosion agent.

*Example 9*

There are mixed 1095 parts of tert-butylamine and 480 parts of water, 330 parts of ethylene oxide is passed as vapor, while the temperature is maintained at 60° C. by heating or cooling as needed. The reaction mixture is stripped on a steam-bath to remove excess amine and water. The residue is then distilled under reduced pressure at 25 mm., the fore-run being discarded and the product collected, in an amount of 679 parts, as a colorless, crystalline, low-melting solid, distilling at 90°–105° C./25 mm. This product is β-tert-butylaminoethanol.

There are mixed 41 parts of tert-butylaminoethanol, 82 parts of methyl methacrylate, and two parts of di-β-naphthol. The mixture is heated under reflux to permit removal of all walter, the methyl methacrylate being returned to the mixture. The thus-dried mixture is cooled an treated with two parts of tetraisopropyl titanate. The mixture is then heated to reflux and distillate is taken off through a short column. Distillate is refluxed at 67° C. and taken off at a rate permitting retention of this temperature for about two hours, when reaction appears complete and the temperature of the distillate rises to 95° C. Methyl methacrylate is distilled off under reduced pressure. Product is distilled at 22 mm. After a small fore-run tert-butylaminoethyl methacrylate is distilled at 110°–112° C./22 mm. The main fraction amounts to 48 parts of this ester.

*Example 10*

A mixture is prepared from 56.1 parts of the tert-octylaminopropanol prepared as in Preparation E, 90 parts of methyl methacrylate, three parts of di-β-naphthol, and 0.5 part of sodium methoxide. This mixture is heated to refluxing temperature. Vapor is taken off through a short column having a partial take-off head. Methanol and some methyl methacrylate are slowly removed at 70°–85° C. Several small additions of the inhibitor, di-β-naphthol, and catalyst, sodium methoxide, are made during the course of the 36 hours over which the reaction is performed. Excess methyl methacrylate is distilled off. The fraction obtained at 138°–155° C./25 mm., amounting to 15.3 parts, is tert-octylaminopropyl methacrylate. The neutralization equivalent found is 253 (theory 255).

*Example 11*

The above procedure is followed but with replacement of the sodium methoxide with tetrabutyl titanate as catalyst in an amount of two parts by weight. The product is distilled at 140°–155° C./25 mm. in an amount of 49 parts. It corresponds in composition to tert-octylaminopropyl methacrylate. Its refractive index, $n_D^{25}$, is 1.4398.

Repetition of the above procedure with substitution of butyl methacrylate for the above methyl ester, with a small adjustment in temperature to dispose of butanol, and starting ester, leads to a reasonably good yield of the identical product.

Substitution of methyl acrylate leads to tert-octylaminopropyl acrylate, distilling at 110°–125° C./20–22 mm.

The monomers of this invention are of considerable interest as chemical intermediates. Since they contain a vinylidene group, they undergo addition reactions thereat with compounds having an active hydrogen atom, as alcohols, amines, nitroalkanes, malonates, acetoacetates, etc. The compounds of this invention also can react at the active hydrogen atom on the amino nitrogen atom. Thus they react with cyanogen halides, with propiolactone, and with other reactive compounds.

For polymerizing the alkylaminoalkyl acrylates and methacrylates the azo catalysts are especially effective. There may be used, for example, azodiisobutyronitrile, azodiisobutyramide, azobis (α,γ-dimethylvaleronitrile), azobis (α-methylbutyronitrile), dimethyl, diethyl, or dibutyl azodiisobutyrate, or dimethyl, diethyl, or dibutyl azobis (methylvalerate). These and other similar azo compounds serve as free radical initiators. They contain an —N=N— group attached to aliphatic carbon atoms, at least one of which is tertiary. These catalysts may be used for preparing both homopolymers and copolymers. An amount of 0.1 to 2% of the weight of monomer or monomers is usually sufficient.

For preparing many copolymers there may also be used peroxidic catalysts. Typical organic peroxides useful as polymerization initiator are benzoyl peroxide, caproyl peroxide, acetyl peroxide, cumene hydroperoxide, methyl ethyl ketone peroxide, tert-butyl hydroperoxide, butyl perbenzoate, etc. An amount of 0.1% to 5% of the weight of monomeric starting materials may be used.

In emulsion or suspension polymerizations there may be used hydrogen peroxide, ammonium persulfate, sodium persulfate, potassium persulfate, or other inorganic peroxidic catalyst, best in a redox system to which a reducing substance such as sodium sulfite, bisulfite, metabisulfite, or hydrosulfite is used with or without a metal activator. Regulators may also be here used, as well as in bulk or solution polymerizations.

Polymerizations are generally accomplished between 50° and 150° C. Azo initiators are best used between 50° and 90° C., while peroxidic catalysts are usually most effective between 90° and 150° C. Of course, in emulsion polymerization temperatures of the order of 10° C. are frequently used at the start with temperatures rising to 50° to 100° C. as reaction proceeds.

Typical polymerizations will now be described.

A. To 50 parts by weight of tert-butylaminoethyl acrylate there is added 0.5 part of dimethyl azodiisobutyrate. Air is displaced from the polymerization cell with nitrogen. The cell and charge are then heated to about 75° C. and held at this level for seven hours. A firm wax-like product forms.

This product was added to a solution of cellulose acetate in a ratio of 10 parts of polymer to 90 parts of cellulose acetate. A film was cast from this solution. The film exhibited good absorbency for acid dyes. Films dyed with a blue acetate dye were tested for gas fading in a standard test. They were found to outlast eight cycles of control samples of dyed acetate ribbon.

B. The above procedure is followed with 50 parts of tert-butylaminoethyl methacrylate and 0.5 part of the same initiator. The product is a hard, clear glass-like shape. It contains about the theoretical percentage of nitrogen.

An interesting property of the polymers of this invention is their color stability.

C. The above procedure was followed with use of tert-octylaminoethyl methacrylate. A rubbery polymer is obtained.

D. The above procedure is applied to the mixed tert-alkylaminoethyl methacrylates having alkyl groups of 18 to 24 carbon atoms. A very viscous, oil-soluble polymeric liquid is obtained. It is useful as an oil additive.

The comparable tert-alkylaminoethyl acrylate was likewise polymerized. It formed a polymer which was fluid enough to be poured at 70° C.

E. In the same way tert-butylaminoethyl acrylate is polymerized with the aid of 1% of its weight of dimethyl azodiisobutyrate.

The resulting polymer is soluble in cellulose acetate solutions. Cellulose acetate films formed therefrom show excellent absorption of acid dyes. In standard gas fading tests these dyed films outlast nine cycles of control samples.

F. To 97 parts of water containing 0.25 part of the sodium salt of octylphenoxytriethoxyethyl sulfate there is added with stirring 3 parts of β-(tert-octylamino) ethyl methacrylate, followed by 0.03 part of ammonium persulfate and 0.03 part of sodium hydrosulfite. The mixture is stirred and heated at 70° C. for six hours. A white dispersion of polymer forms. It is stable for a considerable length of time. Films deposited therefrom on glass are somewhat tacky. The dispersion is of interest as a textile finishing agent.

G. There are taken five parts of the tert-octylaminopropyl methacrylate prepared in Example 10 and thereto is added 0.05 part of dimethyl azodiisobutyrate. The mixture is heated on a steam bath for seven hours to yield a tough rubbery polymer.

The same procedure is followed with the tert-octylaminopropyl methacrylate prepared in Example 11. The same kind of polymer is formed.

Copolymers of the N-tert-alkylaminoalkyl acrylates or methacrylates of this invention may readily be prepared by conventional methods, although here again azo initiators are usually the catalysts of first choice, particularly when the tert-alkylaminoalkyl ester is a major comonomer. The copolymers may on the one hand be formed from mixtures of two or more of the above acrylates and methacrylates. Again, one or more of these esters may be copolymerized with one or more other polymerizable ethylenically unsaturated compounds, particularly with one or more polymerizable monovinylidene compounds. The esters of this invention impart to the usual copolymer a cationic nature. This is of importance where adsorption or adhesion to negatively charged surfaces is desirable, as in many types of coatings, textile finishes, laminates, impregnates, etc.

As typical comonomers there may be mentioned other acrylic and methacrylic esters, acrylonitrile, methacrylonitrile, acrylamide, methacrylamide, N-alkylacrylamides, N-alkylmethacrylamides, esters of itaconic acid, dialkyl maleates and fumarates, styrene, vinyltoluene, p-chlorostyrene, vinylpyridine, vinylpyrrolidone, vinyl esters, allyl esters, etc. Some typical polymerizable unsaturated compounds are methyl acrylate, methyl methacrylate, butyl acrylate, butyl methacrylate, octyl acrylate, nonyl methacrylate, dodecyl acrylate, dodecyl methacrylate, cetyl acrylate, stearyl methacrylate, methoxyethyl acrylate, ethoxyethyl methacrylate, dimethylaminoethyl acrylate or methacrylate, cyclohexyl methacrylate, benzyl acrylate, tetrahydrofurfuryl acrylate, oleyl acrylate, dimethyl itaconate, diethyl itaconate, vinyl acetate, vinyl butyrate, and vinyl laurate. Polyvinylidene compounds can also be used, such as allyl acrylate, vinyloxyethyl acrylate, ethylene diacrylate, or the corresponding methacrylates, divinylbenzene diallyl phthalate, and the like. The resulting copolymers are cross-linked.

H. A mixture is prepared of 27 parts of acrylonitrile, 3 parts of N-tert-octyl-β-aminoethyl methacrylate, 150 parts of water, and 0.75 part of an octylphenoxypolyethoxyethanol containing about 40 ethoxy groups. Nitrogen is passed into the mixture to displace air and to blanket the mixture with inert gas. The mixture is heated to 35° C. and stirred. Addition is made of 0.3 part of ammonium persulfate in 10 parts of water and 0.15 part of sodium hydrosulfite dissolved in 10 parts of water. Stirring is continued for three hours. The solid polymer which is thus formed in suspension is collected on a filter and dried at 50° C. Analysis of the material shows a composition based on about 28% of octylaminoethyl methacrylate and 72% of acrylonitrile.

A portion of this copolymer is placed in a dye solution, which is then heated at 95°–100° C. for 15 minutes. This dye solution is prepared from 500 parts of distilled water, 0.2 part of sulfuric acid, one part of sodium sulfate, and 0.2 part of Calcocid Alizarine Blue. The copolymer is dyed a deep blue.

I. There are mixed 17.2 parts of acrylonitrile, 0.8 part of tert-butylaminoethyl acrylate, and 300 parts of water. Sulfuric acid is added to bring the pH of the mixture to a value of four. The mixture is stirred, blanketed with nitrogen, and treated with 0.6 part of ammonium persulfate and 0.2 part of sodium bisulfite in 34 parts of water. The mixture is held at 30°–40° C. for five hours. Copolymer forms as small beads. It is filtered off, washed, and dried in a yield of 16.5 parts. It is readily dyed with acid dyes.

J. A preparation of dodecyl methacrylate is redistilled to give a distillate which by analysis consists of 99% pure dodecyl ester. There are mixed 12 parts of this pure ester, 8 parts of N-tert-octylaminoethyl methacrylate, two parts of toluene, and 0.15 part of azodiisobutyronitrile. This mixture is slowly charged to a polymerization vessel heated in an oil bath at 110° C. The vessel is blanketed with nitrogen. Additions of catalyst in toluene are made at 3.5 hours (0.06 part), at 4.5 hours (0.024 part), and at 5.5 hours (0.01 part). Heating is continued for a total time of 22 hours. Toluene is added to give a solution containing 51% of non-volatiles. The viscosity of a 30% solution of copolymer in toluene is 45 centistokes at 100° F.

This copolymer dissolves in lubricating oils to improve the viscosity index thereof.

In the same way a copolymer of β-(tert-butylamino)-ethyl methacrylate and dodecyl acrylate is formed. It is likewise useful as an additive for lubricating oils. Similar copolymers have been prepared from tert-octylaminoethyl acrylates or methacrylates and cetyl-stearyl methacrylate, lauryl-myristyl acrylate, cetyl acrylate, lauryl-myristyl methacrylate, dioctyl itaconate, dilauryl itaconate, dodecyl fumarate, and the like. In each case there is a copolymer formed which is soluble in various lubricating oils. Very closely similar copolymers are obtained from tert-alkylaminopropyl acrylates and methacrylates and other polymerizable ethylenically unsaturated compounds.

When the above procedure is carried out with a mixture of 98% tert-butylaminoethyl acrylate and 2% ethylene dimethacrylate a gel results. It has capacity for absorbing acidic constituents from fluids.

The tert-alkylaminoalkyl acrylates and methacrylates, also polymers formed therefrom, form salts with acids. For instance, salts of hydrochloric, sulfuric, or phosphoric acid may be formed by addition of acid to the amino ester. Such salts are generally water-soluble. Salts may also be formed with fatty acids. These are useful for preparing organic solvent solutions. The monomers in salt form may be polymerized in aqueous solution.

For example, a solution is prepared from 18.5 parts of β-tert-butylaminoethyl methacrylate, 18 parts of water, and sufficient concentrated hydrochloric acid to bring the solution to a pH of 7.0. To this solution is added 0.03 part of dimethyl azodiisobutyrate. The reaction mixture is heated at 60°–70° C. The solution becomes increasingly viscous until it is just pourable. This material is useful as an anti-static agent. It also serves as a cationic polyelectrolyte, as in agglomerating soil.

I claim:

1. As new chemical substances, compounds of the structure

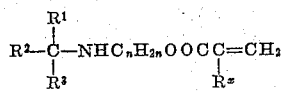

where $R^1$, $R^2$, and $R^3$ are alkyl groups having a total of not over 23 carbon atoms, $R^x$ is a member of the class consisting of hydrogen and the methyl group and $n$ is an integer from two to three, there being two carbon atoms between nitrogen and oxygen atoms.

2. As a new chemical compound, N-tert-butylaminoethyl acrylate.
3. As a new chemical compound, N-tert-octylaminoethyl acrylate.
4. As a new chemical compound, N-tert-dodecylaminoethyl acrylate.
5. As a new chemical compound, N-tert-butylaminoethyl methacrylate.
6. As a new chemical compound, N-tert-octylaminoethyl methacrylate.
7. Polymers of compounds of the structure

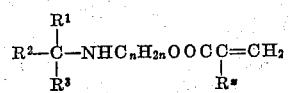

where $R^1$, $R^2$, and $R^3$ are alkyl groups having a total of not over 23 carbon atoms, $R^x$ is a member of the class consisting of hydrogen and the methyl group, and $n$ is an integer from two to three, there being two carbon atoms between nitrogen and oxygen atoms.

8. Copolymers of a compound of the structure

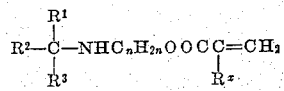

where $R^1$, $R^2$, and $R^3$ are alkyl groups having a total of not over 23 carbon atoms, $R^x$ is a member of the class consisting of hydrogen and the methyl group, and $n$ is an integer from two to three, there being two carbon atoms between nitrogen and oxygen atoms and another polymerizable vinylidene compound.

9. Copolymers of claim 8 in which the vinylidene compound is a monovinylidene compound.

10. A method for preparing tert-alkylaminoalkyl esters of acrylic and methacrylic acid which comprises reacting by heating together an alcohol of the structure

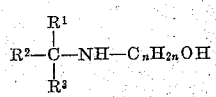

and an ester of the structure $R^0OOCC(R^x)=CH_2$ in the presence of a transesterification catalyst and of a polymerization inhibitor, distilling off an alcohol $R^0OH$, and recovering an ester of the structure

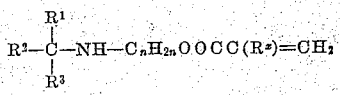

where $R^1$, $R^2$, and $R^3$ are alkyl groups having a total of not over 23 carbon atoms, $R^x$ is a member of the class consisting of hydrogen and the methyl group, $R^0$ is an alkyl group of not over four carbon atoms, and $C_nH_{2n}$ is an alkylene group supplying two carbon atoms in a chain between oxygen and nitrogen atoms and containing not over three carbon atoms.

11. A method for preparing tert-alkylaminoethyl acrylates which comprises reacting by heating together methyl acrylate and a tert-alkylaminoethanol, the alkyl group of which contains not over 24 carbon atoms in the presence of a catalyst from the class consisting of alkali metals, alkali metal alkoxides, tetraalkyl titanates, and aluminum alkoxides, the said alkoxides each having not over four carbon atoms, and of a polymerization inhibitor, distilling off methanol, and separating tert-alkylaminoethyl acrylate.

12. The process of claim 11 in which the tert-alkylaminoethanol is tert-butylaminoethanol.

13. The process of claim 11 in which the tert-alkylaminoethanol is tert-octylaminoethanol.

14. A method for preparing tert-alkylaminoethyl methacrylates which comprises reacting by heating together methyl methacrylate and a tert-alkylaminoethanol, the alkyl group of which contains not over 24 carbon atoms in the presence of a catalyst from the class consisting of alkali metals, alkali metal alkoxides, and aluminum alkoxides, the said alkoxides each having not over four carbon atoms, and of a polymerization inhibitor, distilling off methanol, and separating tert-alkylaminoethyl methacrylate.

15. The process of claim 14 in which the tert-alkylaminoethanol is tert-butylaminoethanol.

16. The process of claim 14 in which the tert-alkylaminoethanol is tert-octylaminoethanol.

References Cited in the file of this patent
UNITED STATES PATENTS

| | | |
|---|---|---|
| 2,104,796 | Dietrich | Jan. 11, 1938 |
| 2,138,031 | Graves | Nov. 29, 1938 |
| 2,138,763 | Graves | Nov. 29, 1938 |